(12) United States Patent
Sato

(10) Patent No.: US 11,821,340 B2
(45) Date of Patent: Nov. 21, 2023

(54) DOUBLE SCROLL TURBINE FLOW PATH

(71) Applicant: IHI Corporation, Tokyo (JP)

(72) Inventor: Wataru Sato, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 17/931,964

(22) Filed: Sep. 14, 2022

(65) Prior Publication Data

US 2023/0043042 A1 Feb. 9, 2023

Related U.S. Application Data

(63) Continuation of application No. PCT/JP2021/022151, filed on Jun. 10, 2021.

(30) Foreign Application Priority Data

Jul. 9, 2020 (JP) .................................. 2020-118279

(51) Int. Cl.
  *F01D 9/02* (2006.01)
  *F01D 25/24* (2006.01)

(52) U.S. Cl.
  CPC ............. *F01D 9/026* (2013.01); *F01D 25/24* (2013.01); *F05D 2220/40* (2013.01); *F05D 2240/12* (2013.01); *F05D 2260/972* (2013.01)

(58) Field of Classification Search
  CPC .......... F01D 9/026; F01D 25/24; F02B 39/00; F02B 37/00; F05D 2220/40; F05D 2240/12; F05D 2260/972
  USPC ...................................................... 414/205
  See application file for complete search history.

(56) References Cited

U.S. PATENT DOCUMENTS

| 2014/0219790 A1 | 8/2014 | Houst et al. |
| 2019/0383152 A1 | 12/2019 | Morita |
| 2023/0043042 A1 * | 2/2023 | Sato ....................... F01D 25/24 |

FOREIGN PATENT DOCUMENTS

| JP | 2016-132996 A | 7/2016 | |
| JP | WO 2018/155532 A1 | 8/2018 | |
| WO | WO-2013099461 A1 * | 7/2013 | ............. F01D 9/026 |

OTHER PUBLICATIONS

International Search Report dated Aug. 10, 2021, in PCT/JP2021/022151, filed on June 10, 2021, 2 pages.

* cited by examiner

*Primary Examiner* — J. Todd Newton
(74) *Attorney, Agent, or Firm* — Oblon, McClelland, Maier & Neustadt, L.L.P.

(57) ABSTRACT

A turbine includes: a turbine blade wheel housed in a housing unit; two turbine scroll flow paths wound radially outward with respect to the turbine blade wheel and connected at positions different from each other in a circumferential direction in an outer circumferential portion of the housing unit; and two scroll outlets each communicating one of the two turbine scroll flow paths with the housing unit, the two scroll outlets formed along the circumferential direction, at least one of the two scroll outlets having a height distribution in which a height in an axial direction is lower than a surrounding height at at least one of an upstream end or a downstream end.

8 Claims, 3 Drawing Sheets

DOUBLE SCROLL TURBINE FLOW PATH

CROSS REFERENCE TO RELATED APPLICATIONS

This application is a continuation application of International Application No. PCT/JP2021/022151, filed on Jun. 10, 2021, which claims priority to Japanese Patent Application No. 2020-118279, filed on Jul. 9, 2020, the entire contents of which are incorporated by reference herein.

BACKGROUND ART

Technical Field

The present disclosure relates to a turbine and a turbocharger. The present application claims the benefit of priority based on Japanese Patent Application No. 2020-118279 filed on Jul. 9, 2020, the content of which is incorporated herein.

Related Art

As a turbine included in a turbocharger or the like, there is known a double scroll turbine including two turbine scroll flow paths wound radially outward with respect to a turbine blade wheel and connected at positions different from each other in a circumferential direction in an outer circumferential portion of a housing unit in which the turbine blade wheel is housed (see, for example, Patent Literature 1).

CITATION LIST

Patent Literature

Patent Literature 1: JP 2016-132996 A

SUMMARY

Technical Problem

In a double scroll turbine, two turbine scroll flow paths communicate with each other via a housing unit in which a turbine blade wheel is housed. Therefore, a flow, in which exhaust gas leaks from one of the turbine scroll flow paths to the other turbine scroll flow path through the housing unit, is generated. The leakage flow of exhaust gas between the two turbine scroll flow paths causes degradation of the performance of the turbine and the performance of an engine connected to the turbocharger.

An object of the present disclosure is to provide a turbine and a turbocharger capable of suppressing a leakage flow of exhaust gas between two turbine scroll flow paths.

Solution to Problem

In order to solve the above disadvantage, a turbine according to the present disclosure includes: a turbine blade wheel housed in a housing unit; two turbine scroll flow paths wound radially outward with respect to the turbine blade wheel and connected at positions different from each other in a circumferential direction in an outer circumferential portion of the housing unit; and two scroll outlets each communicating one of the two turbine scroll flow paths with the housing unit, the two scroll outlets formed along the circumferential direction, at least one of the two scroll outlets having a height distribution in which a height in an axial direction is lower than a surrounding height at at least one of an upstream end or a downstream end.

In the height distribution, a height in the axial direction may be lower than the surrounding height at least at the downstream end.

In the height distribution, a height in the axial direction may be lower than the surrounding height at both of the upstream end and the downstream end.

In the height distribution, a height in the axial direction at the downstream end may be lower than a height in the axial direction at the upstream end.

In order to solve the above disadvantage, a turbocharger of the present disclosure includes the turbine described above.

Effects of Disclosure

According to the present disclosure, it is possible to suppress a leakage flow of exhaust gas between two turbine scroll flow paths.

DESCRIPTION OF EMBODIMENTS

An embodiment of the present disclosure will be described below by referring to the accompanying drawings. Dimensions, materials, other specific numerical values, and the like illustrated in embodiments are merely examples for facilitating understanding, and the present disclosure is not limited thereby unless otherwise specified. Note that, in the present specification and the drawings, components having substantially the same function and structure are denoted by the same symbol, and redundant explanations are omitted. Illustration of components not directly related to the present disclosure is omitted.

Figure 1:
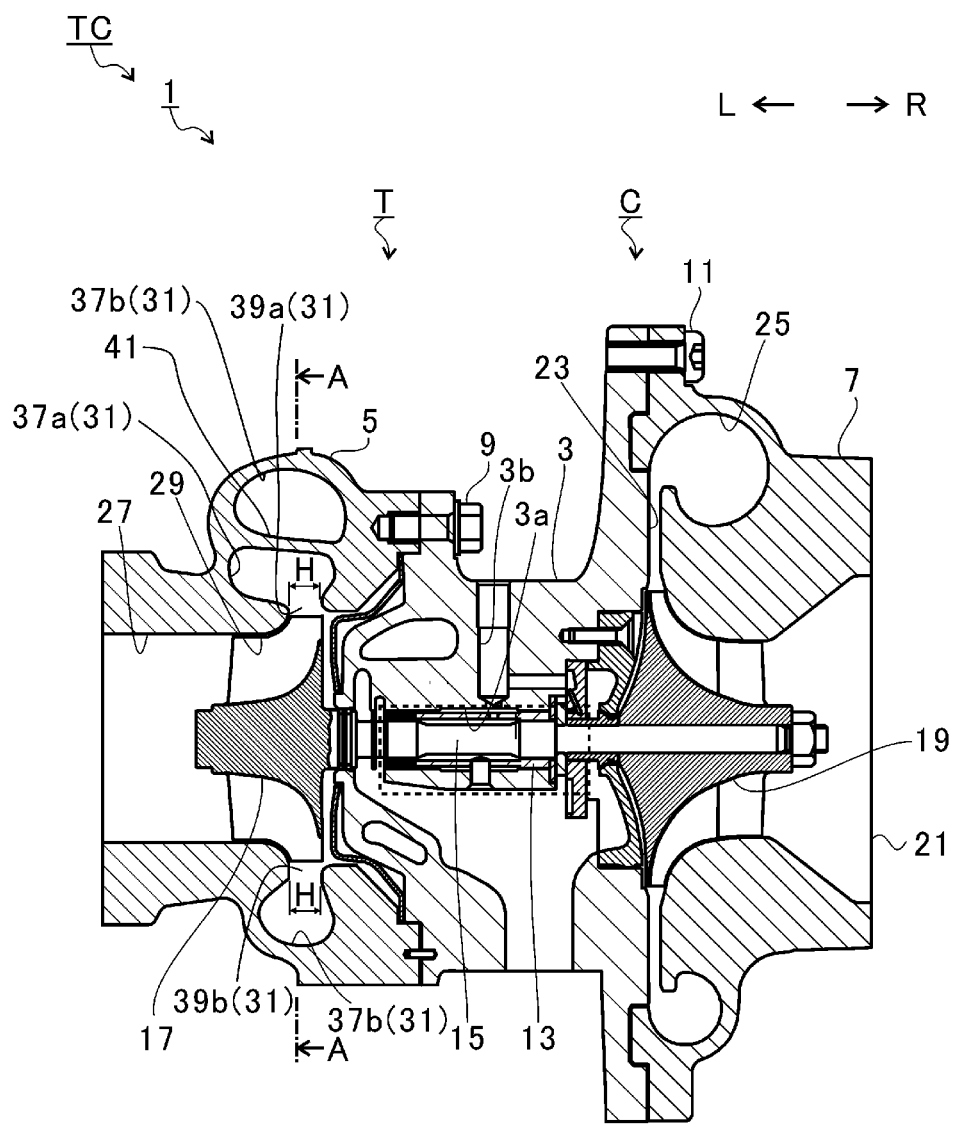
FIG. 1 is a schematic cross-sectional view illustrating a turbocharger according to an embodiment of the present disclosure.

FIG. 1 is a schematic cross-sectional view illustrating a turbocharger TC according to an embodiment of the present disclosure. Hereinafter, description is given on the premise that a direction of an arrow L illustrated in FIG. 1 is the left side of the turbocharger TC. Description is given on the premise that a direction of arrow R illustrated in FIG. 1 is the right side of the turbocharger TC. As illustrated in FIG. 1, the turbocharger TC includes a turbocharger main body 1. The turbocharger main body 1 includes a bearing housing 3, a turbine housing 5, and a compressor housing 7. The turbine housing 5 is connected to the left side of the bearing housing 3 by a fastening bolt 9. The compressor housing 7 is connected to the right side of the bearing housing 3 by a fastening bolt 11. The turbocharger TC includes a turbine T and a centrifugal compressor C. The turbine T includes the bearing housing 3 and the turbine housing 5. The turbine T is a so-called double scroll turbine. The centrifugal compressor C includes the bearing housing 3 and the compressor housing 7.

A bearing hole 3a is formed in the bearing housing 3. The bearing hole 3a penetrates through the turbocharger TC in the left-right direction. In the bearing hole 3a, a semi-floating bearing 13 is disposed. The semi-floating bearing 13 pivotally supports a shaft 15 in a freely rotatable manner. At the left end of the shaft 15, a turbine blade wheel 17 is provided. The turbine blade wheel 17 is housed in the turbine housing 5 in a freely rotatable manner. At the right end of the shaft 15, a compressor impeller 19 is provided. The compressor impeller 19 is housed in the compressor housing 7 in a freely rotatable manner. The axial direction of the shaft 15 is the axial direction of the turbocharger TC (that is, left-right direction). Hereinafter, the axial direction, the radial direction, and the circumferential direction of the turbocharger TC are simply referred to as the axial direction, the radial direction, and the circumferential direction, respectively.

An intake port 21 is formed in the compressor housing 7. The intake port 21 opens to the right side of the turbocharger TC. The intake port 21 is connected to an air cleaner (not illustrated). Facing surfaces of the bearing housing 3 and the compressor housing 7 form a diffuser flow path 23. The diffuser flow path 23 pressurizes the air. The diffuser flow path 23 is formed in an annular shape. The diffuser flow path 23 communicates with the intake port 21 via the compressor impeller 19 on an inner side in the radial direction.

In addition, a compressor scroll flow path 25 is formed in the compressor housing 7. The compressor scroll flow path 25 is formed in an annular shape. The compressor scroll flow path 25 is positioned, for example, on an outer side in the radial direction with respect to the diffuser flow path 23. The compressor scroll flow path 25 communicates with an intake port of an engine (not illustrated) and the diffuser flow path 23. When the compressor impeller 19 rotates, the air is sucked from the intake port 21 into the compressor housing 7. The sucked air is pressurized and accelerated in the process of flowing between the blades of the compressor impeller 19. The pressurized and accelerated air is further pressurized by the diffuser flow path 23 and the compressor scroll flow path 25. The pressurized air is guided to the intake port of the engine.

In the turbine housing 5, a discharge flow path 27, a housing unit 29, and an exhaust flow path 31 are formed. The discharge flow path 27 opens to the left side of the turbocharger TC. The discharge flow path 27 is connected to an exhaust gas purifying device (not illustrated). The discharge flow path 27 communicates with the housing unit 29. The discharge flow path 27 is continuous with the housing unit 29 in the axial direction. The housing unit 29 accommodates the turbine blade wheel 17. The exhaust flow path 31 is formed on an outer side in the radial direction of the housing unit 29. The exhaust flow path 31 communicates with an exhaust manifold of the engine (not illustrated). The exhaust gas discharged from the exhaust manifold of the engine (not illustrated) is guided to the discharge flow path 27 via the exhaust flow path 31 and the housing unit 29. The exhaust gas guided to the discharge flow path 27 rotates the turbine blade wheel 17 in the process of flowing therethrough.

The turning force of the turbine blade wheel 17 is transmitted to the compressor impeller 19 via the shaft 15. When the compressor impeller 19 rotates, the air is pressurized as described above. In this manner, the air is guided to the intake port of the engine.

Figure 2:
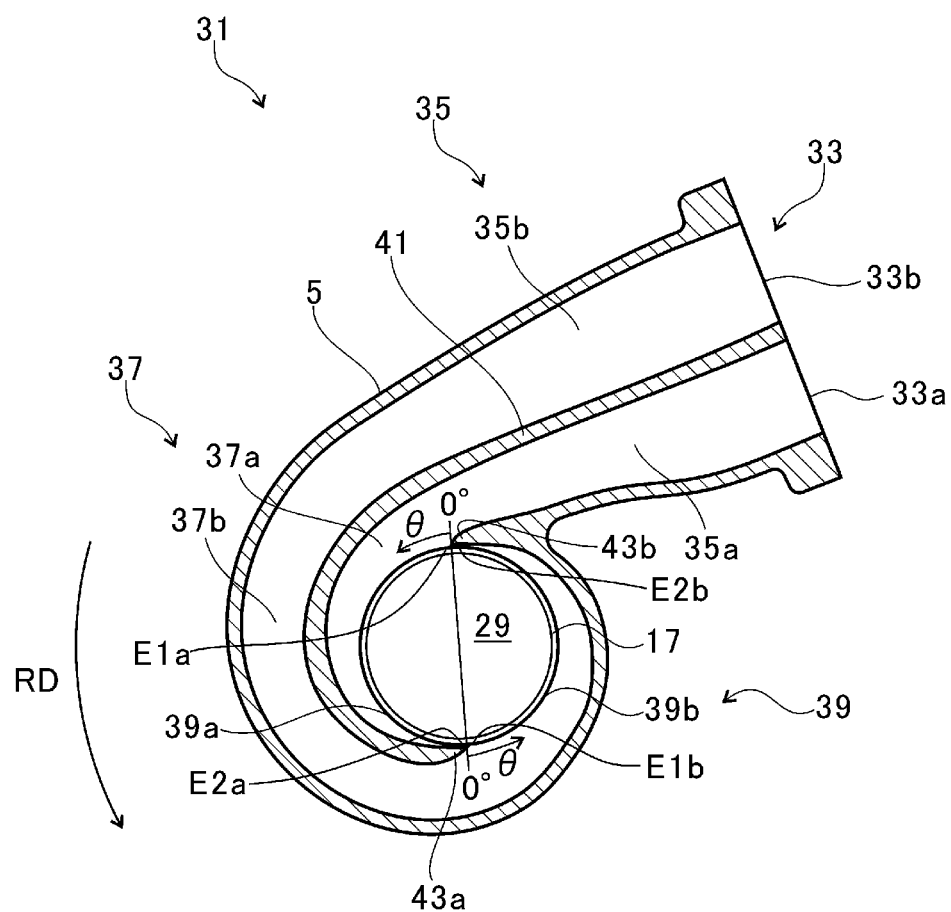
FIG. 2 is a cross-sectional view taken along line A-A in FIG. 1.

FIG. 2 is a cross-sectional view taken along line A-A in FIG. 1. In FIG. 2, as for the turbine blade wheel 17, only the outer circumference is illustrated as a circle. As illustrated in FIG. 2, the exhaust flow path 31 includes an exhaust introduction port 33, an exhaust introduction path 35, a turbine scroll flow path 37, and a scroll outlet 39.

The exhaust introduction port 33 opens to the outside of the turbine housing 5. Exhaust gas discharged from the exhaust manifold of the engine (not illustrated) is introduced to the exhaust introduction port 33.

The exhaust introduction path 35 connects the exhaust introduction port 33 and the turbine scroll flow path 37. The exhaust introduction path 35 is formed, for example, in a linear shape. The exhaust introduction path 35 guides the exhaust gas introduced from the exhaust introduction port 33 to the turbine scroll flow path 37.

The turbine scroll flow path 37 communicates with the housing unit 29 via the scroll outlet 39. The turbine scroll flow path 37 guides the exhaust gas introduced from the exhaust introduction path 35 to the housing unit 29 via the scroll outlet 39.

In the turbine housing 5, a partition plate (partition wall) 41 is formed. The partition plate 41 is disposed in the exhaust flow path 31 (specifically, in the exhaust introduction port 33, the exhaust introduction path 35, and the turbine scroll flow path 37). The partition plate 41 partitions the exhaust flow path 31 in the circumferential direction of the turbine blade wheel 17. The partition plate 41 is connected on the inner face of the exhaust introduction port 33, the exhaust introduction path 35, and the turbine scroll flow path 37 in the axial direction. The partition plate 41 extends along the exhaust flow path 31. That is, the partition plate 41 extends along the flow direction of the exhaust gas. Hereinafter, the upstream side in the flow direction of exhaust gas is simply referred to as the upstream side, and the downstream side in the flow direction of exhaust gas is simply referred to as the downstream side.

The exhaust introduction port 33 is divided into an exhaust introduction port 33a and an exhaust introduction port 33b by the partition plate 41. In the present embodiment, the exhaust introduction port 33a is positioned radially inward with respect to the exhaust introduction port 33b.

The exhaust introduction path 35 is divided into an exhaust introduction path 35a and an exhaust introduction path 35b by the partition plate 41. In the present embodiment, the exhaust introduction path 35a is positioned radially inward with respect to the exhaust introduction path 35b. The exhaust introduction path 35a communicates with the exhaust introduction port 33a. The exhaust introduction path 35b communicates with the exhaust introduction port 33b.

The turbine scroll flow path 37 is divided into a turbine scroll flow path 37a and a turbine scroll flow path 37b by the partition plate 41. In the present embodiment, the turbine scroll flow path 37a is positioned radially inward with respect to the turbine scroll flow path 37b. The turbine scroll flow path 37a communicates with the exhaust introduction path 35a. The turbine scroll flow path 37b communicates with the exhaust introduction path 35b. The two turbine scroll flow paths 37a and 37b are wound radially outward with respect to the turbine blade wheel 17. The two turbine scroll flow paths 37a and 37b are wound so as to approach the turbine blade wheel 17 as they extend in the rotation direction RD of the turbine blade wheel 17. The radial width of each of the turbine scroll flow paths 37 decreases as it extends from the upstream side to the downstream side.

The two turbine scroll flow paths 37a and 37b are connected at positions different from each other in the circumferential direction to the outer circumferential portion of the housing unit 29. The turbine scroll flow path 37a communicates with the housing unit 29 via a scroll outlet 39a. The turbine scroll flow path 37b communicates with the housing unit 29 via a scroll outlet 39b. In this manner, the two scroll outlets 39a and 39b communicate the two turbine scroll flow paths 37a and 37b with the housing unit 29, respectively.

The two scroll outlets 39a and 39b are formed along the circumferential direction. Specifically, the scroll outlet 39a communicates with the housing unit 29 over half the circumference (specifically, the left half circumference in FIG. 2) of the housing unit 29. The scroll outlet 39b communicates with the housing unit 29 over the other half circumference (specifically, the right half circumference in FIG. 2) of the housing unit 29. The two scroll outlets 39a and 39b face each other in the radial direction across the turbine blade wheel 17.

A first tongue 43a and a second tongue 43b are formed in the turbine housing 5. Note that, hereinafter, the first tongue 43a and the second tongue 43b are simply referred to as the tongues 43 in a case where they are not specifically distinguished. The tongues 43 partition into the turbine scroll flow path 37a and the turbine scroll flow path 37b. The tongues 43 also partition into the scroll outlet 39a and the scroll outlet 39b.

The first tongue 43a is formed at the downstream end of the partition plate 41. The first tongue 43a partitions into a downstream end E2a of the scroll outlet 39a and an upstream end E1b of the scroll outlet 39b. The upstream end E1b of the scroll outlet 39b is positioned on a rotation direction RD side with respect to the first tongue 43a. The downstream end E2a of the scroll outlet 39a is positioned on the opposite side of the rotation direction RD with respect to the first tongue 43a.

The second tongue 43b is disposed at a position facing the downstream end of the turbine scroll flow path 37b. The second tongue 43b partitions into a downstream end E2b of the scroll outlet 39b and an upstream end E1a of the scroll outlet 39a. The upstream end E1a of the scroll outlet 39a is positioned on the rotation direction RD side with respect to the second tongue 43b. The downstream end E2b of the scroll outlet 39b is positioned on the opposite side of the rotation direction RD with respect to the second tongue 43b.

The circumferential position of the first tongue 43a is shifted by 180° with respect to the circumferential position of the second tongue 43b. That is, the first tongue 43a and the second tongue 43b face each other across the turbine blade wheel 17 in the radial direction. However, the circumferential position of the first tongue 43a may be shifted by an angle different from 180° with respect to the circumferential position of the second tongue 43b.

In this case, the exhaust manifold of the engine (not illustrated) includes two or more, a plurality of, divided paths. Some of the plurality of divided paths are connected to the exhaust introduction port 33a. The other divided paths are connected to the exhaust introduction port 33b. Exhaust gas discharged from the engine (not illustrated) flows through the divided paths and is introduced into the exhaust introduction port 33a or the exhaust introduction port 33b. At the timing when the exhaust gas is introduced into one of the exhaust introduction port 33, basically, no exhaust gas is introduced into the other exhaust introduction port 33. The introduction of exhaust gas into the exhaust introduction port 33a and the introduction of exhaust gas into the exhaust introduction port 33b are alternately repeated.

The exhaust gas introduced into the exhaust introduction port 33a flows from the scroll outlet 39a to the housing unit 29 through the exhaust introduction path 35a and the turbine scroll flow path 37a. The exhaust gas introduced into the exhaust introduction port 33b flows from the scroll outlet 39b to the housing unit 29 through the exhaust introduction path 35b and the turbine scroll flow path 37b. At the timing when the exhaust gas flows to one of the turbine scroll flow paths 37, basically, no exhaust gas flows to the other turbine scroll flow path 37. Therefore, a pressure difference is generated between the turbine scroll flow path 37a and the turbine scroll flow path 37b, and a leakage flow of the exhaust gas is generated between the two turbine scroll flow paths 37. In the above leakage flow, the exhaust gas leaks from one of the turbine scroll flow paths 37 to the other turbine scroll flow path 37 through the vicinity of the tongues 43.

In the turbine T of the present embodiment, the leakage flow of exhaust gas between the two turbine scroll flow paths 37 is suppressed by devising the distribution of the height H in the axial direction (see FIG. 1) of the scroll outlets 39 in the circumferential direction. Hereinafter, the height H of a scroll outlet 39 in the axial direction is also referred to as an outlet height H.

As described above, the scroll outlets 39 is formed along the circumferential direction. Here, the circumferential position of a scroll outlet 39 is expressed using a shift angle θ with respect to the upstream end of the scroll outlet 39. As illustrated in FIG. 2, in a case where θ=0° at the upstream end E1a of the scroll outlet 39a, θ=180° at the downstream end E2a of the scroll outlet 39a. Assuming that θ=0° at the upstream end E1b of the scroll outlet 39b, θ=180° at the downstream end E2b of the scroll outlet 39b.

Figure 3:
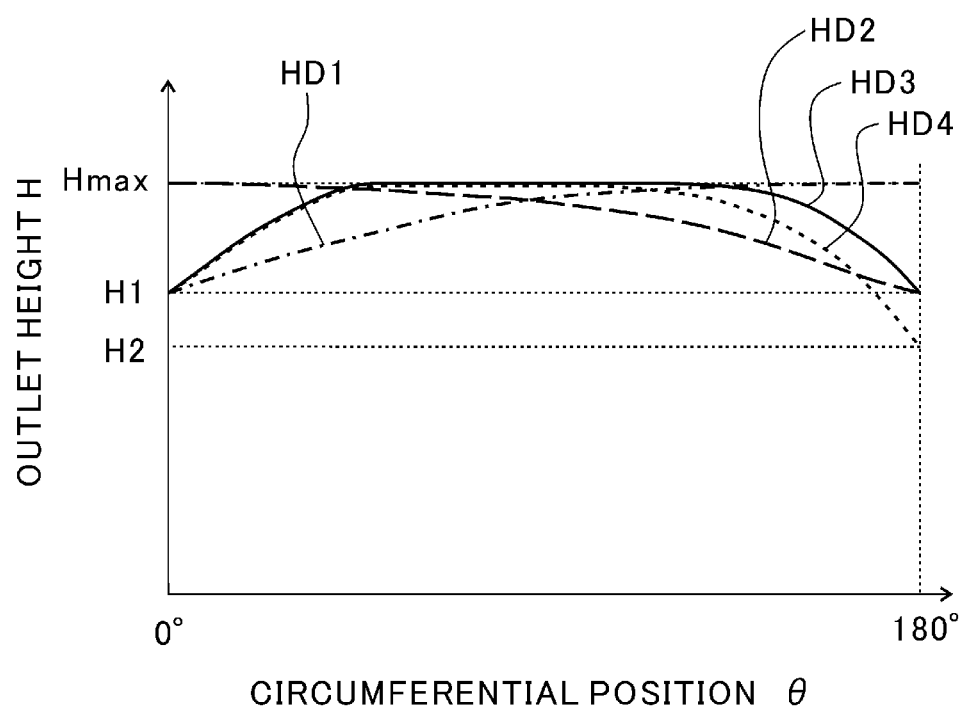
FIG. 3 is a graph illustrating an example of the height distribution of a scroll outlet according to the present embodiment.

FIG. 3 is a graph illustrating an example of the height distributions of the scroll outlets 39. In FIG. 3, four distributions of height distributions HD1, HD2, HD3, and HD4 are illustrated as examples of the height distribution of the scroll outlets 39.

The height distribution may be the same between the scroll outlet 39a and scroll outlet 39b. However, the present disclosure is not limited thereto, and the height distribution may be different between the scroll outlet 39a and the scroll outlet 39b. For example, in a case where each of the scroll outlets 39 has any one of the height distributions HD1, HD2, HD3, or HD4, there are sixteen combinations as combinations of the height distributions of the scroll outlet 39a and the scroll outlet 39b. Note that the height distributions HD1, HD2, HD3, and HD4 are merely examples of the height distributions of the scroll outlets 39. Each of the scroll outlets 39 may have a height distribution other than the height distributions HD1, HD2, HD3, and HD4.

In the height distribution HD1, the outlet height H has the maximum value Hmax at a circumferential position of θ=180° (that is, at the downstream ends E2a and E2b). The outlet height H decreases as θ decreases from 180° to 0°. The outlet height H is the minimum height H1 at a circumferential position of θ=0° (that is, at the upstream ends E1a and E1b). That is, in the height distribution HD1, the outlet height H is lower at the upstream ends E1a and E1b than that of the surroundings.

In the height distribution HD2, the outlet height H has the maximum value Hmax at the circumferential position of θ=0° (that is, the upstream ends E1a and E1b). The outlet height H decreases as θ increases from 0° to 180°. The outlet height H is the minimum height H1 at the circumferential position of θ=180° (that is, at the downstream ends E2a and E2b). That is, in the height distribution HD2, the outlet height H is lower at the downstream ends E2a and E2b than that of the surroundings.

In the height distribution HD3, the outlet height H has the maximum value Hmax at a circumferential position where θ is an angle between 0° and 180° (that is, on the central side in the circumferential direction). The outlet height H decreases from the central side in the circumferential direction toward the circumferential position of θ=0° (that is, at the upstream ends E1a and E1b). The outlet height H decreases from the central side in the circumferential direction toward the circumferential position of θ=180° (that is, at the downstream ends E2a and E2b). The outlet height H is the minimum height H1 at both the circumferential position of θ=0° (that is, at the upstream ends E1a and E1b) and the circumferential position of θ=180° (that is, at the downstream ends E2a and E2b). That is, in the height distribution HD3, the outlet height H is lower than that of the surroundings at both of a set of the upstream ends E1a and E1b and a set of the downstream ends E2a and E2b.

In the height distribution HD4, similarly to the height distribution HD3, the outlet height H is lower than that of the surroundings at both the circumferential position of θ=0° (that is, at the upstream ends E1a and E1b) and the circumferential position of θ=180° (that is, at the downstream ends E2a and E2b). Here, the outlet height H at the circumferential position of θ=0° (that is, the upstream ends E1a and E1b) is the height H1. The outlet height H at the circumferential position of θ=180° (that is, the downstream ends E2a and E2b) is a height H2 lower than the height H1. That is, in the height distribution HD4, the outlet height H at the downstream ends E2a and E2b is lower than the outlet height H at the upstream ends E1a and E1b.

In the turbine T of the present embodiment, as in the height distributions HD1, HD2, HD3, and HD4, the scroll outlets 39 has a height distribution in which the height H (that is, the outlet height H) in the axial direction is lower than that of the surroundings at least at one of the upstream ends E1a and E1b and the downstream ends E2a and E2b. At the position where the outlet height H is low, the exhaust gas flows out toward the housing unit 29 at a higher flow rate than at the position where the outlet height H is high. As a result, a component, on a radially inner side, of the flow rate of the exhaust gas flowing from at least one of the upstream ends E1a and E1b and the downstream ends E2a and E2b to the housing unit 29 can be increased.

Furthermore, in a turbine scroll flow path 37 on a side where the exhaust gas flows, the flow rate of the exhaust gas at at least one of the upstream ends E1a and E1b and the downstream ends E2a and E2b can be increased, and thus the pressure in the vicinity of the tongues 43 can be reduced. As a result, it is possible to reduce the pressure difference in the vicinity of the tongues 43 between the turbine scroll flow path 37a and the turbine scroll flow path 37b.

Therefore, by making the outlet height H lower than that of the surroundings at at least one of the upstream ends E1a and E1b and the downstream ends E2a and E2b, it becomes possible to suppress the exhaust gas from leaking from one of the turbine scroll flow paths 37 to the other turbine scroll flow path 37 through the vicinity of the tongues 43. Therefore, it is possible to suppress the leakage flow of exhaust gas between the two turbine scroll flow paths 37. Therefore, it is possible to suppress deterioration in the performance of the turbine T and the performance of the engine connected to the turbocharger TC.

Note that, in the turbine T of the present embodiment, it is required that at least one of the scroll outlet 39a and the scroll outlet 39b has the above height distribution (that is, a height distribution in which the height H in the axial direction is lower than that of the surroundings at at least one of the upstream ends E1a and E1b and the downstream ends E2a and E2b). That is, only one of the scroll outlet 39a and the scroll outlet 39b may have the above height distribution. For example, the outlet height H may be constant at one of the scroll outlet 39a and the scroll outlet 39b regardless of the circumferential position. Both of the scroll outlet 39a and the scroll outlet 39b may have the above height distribution.

Like the height distributions HD2, HD3, and HD4, in the height distribution of the scroll outlet 39, it is preferable that the height H (that is, the outlet height H) in the axial direction is lower than that of the surroundings at least at the downstream ends E2a and E2b. Here, in the turbine scroll flow path 37, in the vicinity of the upstream end E1a (E1b), the flow direction of exhaust gas is opposite to the direction from the upstream end E1a (E1b) to the downstream end E2b (E2a) (that is, the direction of the leakage flow). On the other hand, in the turbine scroll flow path 37, in the vicinity of the downstream end E2a (E2b), the flow direction of the exhaust gas coincides with the direction from the downstream end E2a (E2b) to the upstream end E1b (E1a) (that is, the direction of the leakage flow). Therefore, the exhaust gas flowing from the downstream ends E2a and E2b to the housing unit 29 is more likely to generate a leakage flow as compared with the exhaust gas flowing from the upstream ends E1a and E1b to the housing unit 29.

Therefore, by setting the outlet height H to be lower than that of the surroundings at least at the downstream ends E2a and E2b, it is possible to suppress a leakage flow generated by the exhaust gas flowing from the downstream ends E2a and E2b to the housing unit 29 (that is, a leakage flow more likely to occur as compared with the upstream ends E1a and E1b). Therefore, since it is possible to suppress the leakage flow at the downstream ends E2a and E2b which is more likely to occur as compared with the upstream ends E1a and E1b, it is possible to effectively suppress the leakage flow of the exhaust gas between the two turbine scroll flow paths 37.

As in the height distributions HD3 and HD4, in the height distribution of the scroll outlet 39, it is preferable that the height H (that is, the outlet height H) in the axial direction is lower than that of the surroundings at both of the set of the upstream ends E1a and E1b and the set of the downstream ends E2a and E2b. As a result, in addition to the leakage flow generated by the exhaust gas flowing from the downstream ends E2a and E2b to the housing unit 29, the leakage flow generated by the exhaust gas flowing from the upstream ends E1a and E1b to the housing unit 29 can be suppressed. Therefore, it is possible to more effectively suppress the leakage flow of the exhaust gas between the two turbine scroll flow paths 37.

In the height distribution in which the height H (that is, the outlet height H) in the axial direction is lower than that of the surroundings in both of the set of the upstream ends E1a and E1b and the set of the downstream ends E2a and E2b as in the height distribution HD4, it is preferable that the height H (that is, the outlet height H) in the axial direction at the downstream ends E2a and E2b is lower than the height H (that is, the outlet height H) in the axial direction at the upstream ends E1a and E1b. As described above, the exhaust gas flowing from the downstream ends E2a and E2b to the housing unit 29 is more likely to generate a leakage flow as compared with the exhaust gas flowing from the upstream ends E1a and E1b to the housing unit 29. Therefore, by making the outlet height H at the downstream ends E2a and E2b lower than the outlet height H at the upstream ends E1a and E1b, it becomes possible to especially effectively suppress the leakage flow generated by the exhaust gas flowing from the downstream ends E2a and E2b to the housing unit 29. Therefore, it is possible to more effectively suppress the leakage flow of exhaust gas between the two turbine scroll flow paths 37.

Although the embodiment of the present disclosure has been described with reference to the accompanying drawings, it is naturally understood that the present disclosure is not limited to the above embodiment. It is clear that those skilled in the art can conceive various modifications or variations within the scope described in the claims, and it is understood that they are naturally also within the technical scope of the present disclosure.

Although the example in which the turbine T is mounted in the turbocharger TC has been described above, the turbine T may be mounted on a device other than the turbocharger TC (for example, a generator or the like).

In the above description, the example has been described in which a set of the exhaust introduction port 33*a*, the exhaust introduction path 35*a*, and the turbine scroll flow path 37*a* and a set of the exhaust introduction port 33*b*, the exhaust introduction path 35*b*, and the turbine scroll flow path 37*b* are each formed side by side in the radial direction; however, the positional relationship among the respective components in the exhaust flow path 31 is not limited to this example. For example, the set of the exhaust introduction port 33*a*, the exhaust introduction path 35*a*, and the turbine scroll flow path 37*a* and the set of the exhaust introduction port 33*b*, the exhaust introduction path 35*b*, and the turbine scroll flow path 37*b* may be formed side by side in the axial direction.

What is claimed is:

1. A turbine comprising:
a turbine blade wheel housed in a housing unit;
two turbine scroll flow paths wound radially outward with respect to the turbine blade wheel and connected at positions different from each other in a circumferential direction in an outer circumferential portion of the housing unit; and
two scroll outlets each communicating one of the two turbine scroll flow paths with the housing unit, the two scroll outlets formed along the circumferential direction, at least one of the two scroll outlets having a height distribution in which a height in an axial direction of at least one of an upstream end or a downstream end of the at least one of the two scroll outlets is lower than a height in the axial direction of a portion adjacent to the at least one of an upstream end or a downstream end in the circumferential direction of the at least one of the two scroll outlets.

2. The turbine according to claim 1,
wherein, in the height distribution, the height in the axial direction is lower than the height in the axial direction of the portion adjacent to the at least one of an upstream end or a downstream end in the circumferential direction of the at least one of the two scroll outlets at least at the downstream end.

3. The turbine according to claim 2,
wherein, in the height distribution, the height in the axial direction is lower than the height in the axial direction of the portion adjacent to the at least one of an upstream end or a downstream end in the circumferential direction of the at least one of the two scroll outlets at both of the upstream end and the downstream end.

4. The turbine according to claim 3,
wherein, in the height distribution, the height in the axial direction at the downstream end is lower than the height in the axial direction at the upstream end.

5. A turbocharger comprising the turbine according to claim 1.

6. A turbocharger comprising the turbine according to claim 2.

7. A turbocharger comprising the turbine according to claim 3.

8. A turbocharger comprising the turbine according to claim 4.

* * * * *